Jan. 12, 1954 L. E. BARTON 2,666,135

PULSE DISCRIMINATORY CIRCUIT

Filed May 28, 1948

INVENTOR
Loy E. Barton
BY John G. Mitchell
ATTORNEY

Patented Jan. 12, 1954

2,666,135

UNITED STATES PATENT OFFICE 2,666,135

PULSE DISCRIMINATORY CIRCUIT

Loy E. Barton, Princeton, N. J., assignor to Radio Corporation of America, a corporation of Delaware Application May 28, 1948, Serial No. 29,776

4 Claims. (Cl. 250—27)

Figure 1:
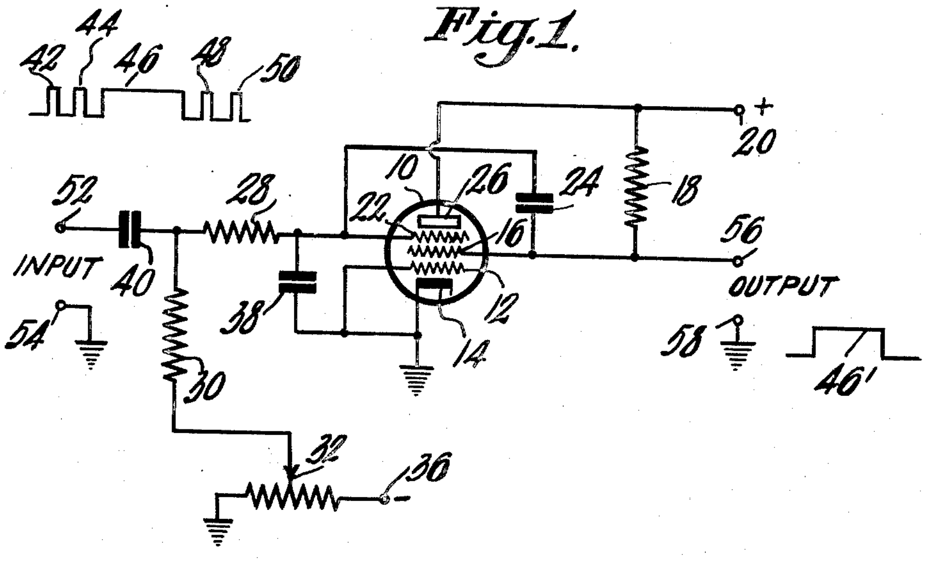

This invention relates to apparatus for effecting electronic pulse width discrimination and particularly to discriminating circuits which provide separation of electrical synchronizing pulses in accordance with their time durations.

It is often found necessary in the design of many types of present day electronic equipment to provide some means for discriminating between electrical pulses having predetermined time widths. Particularly is this true, for exple, in teleran, shorean, radar, and television, in which a number of different operational functions are assigned to signal pulses having respectively different time durations. The system most commonly employed for vertical frame and horizontal line synchronizing pulse discrimination in commercial type television reception circuits usually includes two signal channels for respective amplification of the vertical and horizontal synchronizing information. These two channels are provided with common input circuits, with an integrating circuit placed in cascade with the longer or vertical frame synchronizing pulse amplifier and a differentiating circuit in cascade with the shorter or horizontal line synchronizing pulse amplifier. With such a system the contour of the longer pulse width is necessarily distorted due to the storage action of the integrating circuit while any noise disturbances that might be present in the composite synchronizing signal necessarily find easy passage through the differentiating circuit. Vertical synchronizing pulse distortion resulting from integration tends to produce a sloping "front edge" on the sync pulse which in turn reduces the timing precision of the vertical sweep circuits. The appearance of noise signals in the output of the horizontal pulse amplifier, unless other precautions are taken, will provide erroneous synchronizing information for the television receiver horizontal line deflection signal generator and thereby create undesirable "tearing" or distortion of the reproduced television image.

Therefore, in the above referenced fields of communications, as well as in other electronic systems, a pulse width discriminating device which provides effective passage of steep wave front pulses having a time duration in excess of a predetermined period while discriminating against or preventing passage of pulses having duration times less than this predetermined period is of considerable value. A number of approaches have been made toward the design of such devices, but in most cases the circuit complexity and comparative cost of arrangements found satisfactorily operative have discouraged their use in the manufacture of competitive electronic equipment where their inclusion would indeed offer material improvements in equipment performance.

According to the operation of the present invention the separation of electrical pulses having different time durations is made possible with relative simplicity and low cost through the use of a single pentode vacuum tube connected for operation as a regenerative negative transconductance amplifier whose threshold of regeneration is reached by the integration of a pulse having at least a predetermined time duration but is not attained by pulses having less than this predetermined time duration.

It is therefore a purpose of this invention to provide economical means for pulse width discrimination which permits passage of only those electrical pulses having a time duration in excess of a predetermined time interval.

It is another object of this invention to provide an economical system of pulse width discrimination wherein an output pulse is derived from the system in response to signal input pulses having a time duration in excess of a predetermined time interval, said system being adapted to permit the adjustment of the duration of the output pulse so produced.

It is further a purpose of this invention to provide a form of single vacuum tube pulse amplifier which has pulse width discriminatory characteristics such that only those input pulses having a time duration in excess of a predetermined value will cause an output signal to be developed by the amplifier stage.

Figure 2:
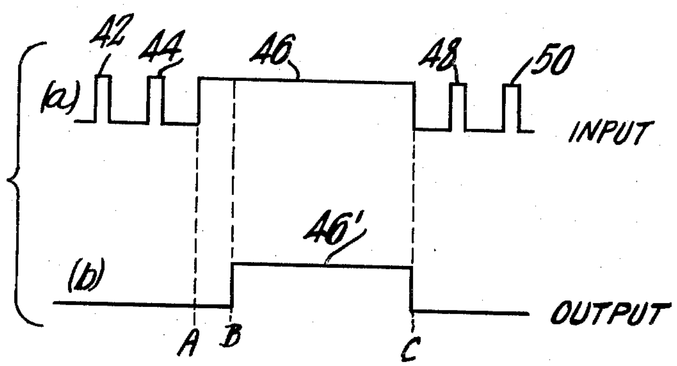

Other objects and advantages of the present invention will become apparent as reference is made to the specification taken in connection with the associated drawings. In the drawings:

Figure 1 is a schematic representation of an embodiment of the present invention; and Figure 2 is a representation of signal waveform contours encountered in the operation of the embodiment shown in Figure 1.

Referring now to Figure 1 a vacuum tube 10 of the pentode variety is shown connected as a negative trans-conductance amplifier. The control grid 12 is externally connected to the cathode 14, while screen grid 16 is supplied with a positive potential through load resistor 18 from power supply source terminal 20. Any signal appearing on screen grid 16 is also applied in part to the suppressor grid 22 by means of coupling condenser 24. The plate electrode 26 of the vacuum tube 10 is polarized by direct connection to the potential source 20. The suppressor grid 22 is shown to be supplied with a variable negative bias voltage through resistors 28 and 30, resistor 30 being connected to the center tap 32 of potentiometer 34, which is in turn connected across a bias voltage supply 36 to ground. From the suppressor grid 22 to ground is placed storage condenser 38 across which, as will be later seen, appears an integrated version of the signal applied to the input circuit by means of coupling condenser 40.

In the operation of the applicant's invention, as illustrated in Figure 1, it can be appreciated that if the voltage applied to suppresser grid 22 is sufficiently negative, a condition of plate current cutoff will obtain in the vacuum tube 10. Under such conditions all the electrons emitted from the cathode electrode 14 will be available to constitute screen current through screen load resistor 18. However, should the suppressor voltage 22 be permitted to increase sufficiently positive to permit plate current flow some electrons otherwise going to the screen grid 16 will now be attracted by the plate 26 and thereby tend to reduce the electrode current of screen grid 16. Since a decrease in screen current through resistor 18 results in an increase in screen potential which in turn is occasioned by an increase in suppressor grid voltage, it is apparent that with the arrangement shown, any signal appearing across the screen load resistor 18 will necessarily be in phase with the signal applied to the suppressor grid 22. This action follows according to well known principles of negative conductance amplifier action, described in full detail in the publication "Radio Engineers Handbook," by F. E. Terman (pp. 318–319), first edition. Electron tubes of the transitron or negative transconductance variety may be used in this type of amplifier. With a 6AS6 pentode an overall amplification of 4 may be realized from suppressor grid to screen. It will be noticed that some of the screen output signal is adapted to be capacitively coupled through condenser 24 to the suppressor grid 22. Hence, whenever plate current is permitted to flow the circuit will act as a form of transitron oscillator since under conditions of plate current the output signal appearing on screen 16 which is in part coupled back to the suppressor grid 22 by condenser 24 is in phase with the input signal applied to suppressor grid 22. Under these regenerative conditions the screen current will quickly establish itself at a minimum corresponding to a plate current maximum.

For pulse width discriminatory action the suppressor grid 22 bias voltage is adjusted negatively in excess of that value required for no signal static plate current cutoff which permits a maximum flow of screen current. A study of Figure 1 reveals that the resistor 28 in combination with capacitor 38 presents a simple form of integrating circuit which acts upon any input signal. Let it be presumed that a series of pulses such as 42, 44, 46, 48, and 50 are applied to the input terminals 52 and 54 of the amplifier under the above conditions of static plate current cutoff due to suppressor grid bias. Although the exact form of conventional television sync signals is not shown in the drawing, for the sake of convenience let it be supposed that the narrower pulses 42, 44, 48, and 50 have each a two-microsecond duration and are suitable for use as horizontal synchronizing pulses, and that the longer pulse 46 has a time duration of approximately 10 microseconds and is suitable for use as vertical synchronizing signals. Such a sync signal wave form is not according to the standards set by the Radio Manufacturer's Association for commercial television transmission but may be used for television and related purposes where adherence to the standards signal is not necessary. If the integrating circuit time constant comprising resistor 28 and condenser 38 is properly selected, the influence of the shorter two microsecond signals such as 42 and 44 will not produce sufficient positive voltage rise across capacitor 38 to permit plate current conduction in the vacuum tube 10, but 10 microsecond pulses will sufficiently charge capacitor 38 and increase the suppressor grid voltage to a value great enough to establish plate current conduction and thereby initiate the cumulative regenerative action of the amplifier stage producing a steep drop in screen current through resistor 18 with the attendant rapid increase of screen potential. As soon as the applied pulse 46 is terminated the voltage on the suppressor grid 22 will drop sufficiently to cause some decrease in plate current which produces a corresponding decrease in screen potential. Accordingly, this drop in screen potential induces regenerative action through condenser 24 to rapidly drop the suppressor grid voltage until plate current is cut off at which value the circuit is quiescent until the application of the next pulse of sufficient duration. Through the proper selection of the time constant integrating circuit and the selection of the applied suppressor grid static potential at a level appropriately below plate current cutoff of the vacuum tube 10, the above configuration may be made to manifestly ignore pulse lengths of less than 3 microseconds while effectively passing all pulse lengths in excess of 3 microseconds thereby discriminating against the two microsecond horizonal pulses 42, 44, 48, and 50 while ostensively passing the longer duration 10 microsecond pulse. Therefore the signal appearing at output terminals 56 and 58 will contain pulse signals due only to the influence of the longer duration pulses.

Reference to Figure 2 illustrates more clearly the typical waveforms encountered in the operation of the discriminator as shown in Figure 1. Figure 2*a* corresponds to the input signal as applied to the pulse discriminator amplifier and Figure 2*b* shows properly orientated in time with respect to the input signal the derived output signal from the pulse discriminating circuit output terminals 56 and 58. As can be seen in Figure 2 the genesis of the output pulse 46′ produced by the input pulse 46 is slightly delayed with respect to the latter by the time AB and consequently suffers a reduction in pulse duration as compared to pulse 46 by this amount. The width of the output pulse BC for a given width of input pulse A. C. may be controlled within limits by the static bias applied to the suppressor grid 22. This action logically follows, since the more negative the suppressor grid potential the longer time it will take for an applied input pulse of a given duration (assuming constancy of input amplitude) to effect sufficient rise in potential across storage capacitor 38 of the integrating network to initiate plate current flow in the vacuum tube 10. Since the initiation of plate current establishes the leading edge (B) of the output pulse, the potentiometer 34 thus acts not only as a width control of the output pulse but also as a form of delay control. It is apparent that the delay time AB is also equivalent to the minimum duration of an applied input pulse to which the circuit will respond and hence potentiometer 34 offers control over this aspect of the system operation. Of course, the time constant of the integrating network as well as any system change which would affect the value of suppressor grid potential necessary for plate current cutoff will necessarily provide corresponding control over the delay and minimum response time of the circuit. Although it is not intended that this invention be limited thereto, the following circuit constants for Figure 1 are given by way of example:

| | |
|---|---|
| 40 | .01 microfarad |
| 28 | 3300 ohms |
| 38 | 15 micromicrofarads |
| 30 | 100,000 ohms |
| 34 | 1000 ohms |
| 36 | 12 volts |
| 24 | 8 micromicrofarads |
| 18 | 15,000 ohms |
| Tube 10 | commercial type 6AS6 |

Such a circuit arrangement will be found to provide adequate pulse discrimination for differentiating against pulse widths of 2 microseconds over that of 10 microseconds as before described. By the proper choice of an integrating circuit time constant, suppressor grid bias and degree of feedback, it is possible to design a single stage discriminating circuit having the same configuration as Figure 1 to effectively pass all pulses wider than about two microseconds and to provide rejection of pulses narrower than about one and one-half microseconds.

What is claimed is:

1. In an electric wave discriminatory system the combination of electronic discharge tube having cathode, a control grid, a screen grid, a suppressor grid, and a plate electrode, circuit connections adapting said discharge tube for operation as a negative transconductance amplifier having an input circuit associated with said suppressor grid, and an output circuit associated with said screen grid, means connecting said output circuit in regenerative relationship with said input circuit, means for applying a control potential to said suppressor grid for conditionally inactivating said regenerative amplifier circuit, and an electrical integrating circuit intercollated in said input circuit, said integrating circuit being adapted to respond to a series of electric wave signals whereby said amplifier circuit is rendered regeneratively active by only those wave signals imparting to said integrating circuit an amount of integratable energy in excess of a predetermined magnitude.

2. In an electric wave discriminatory system the combination of an electronic discharge tube having a first grid and a second grid, circuit connections adapting said discharge tube for operation as a negative transconductance amplifier having an input circuit associated with said first grid and an output circuit associated with said second grid, an electrical impedance connecting output circuit in regenerative relationship to said input circuit, a source of unidirectional potential, an electrically conductive circuit path applying a portion of said unidirectional potential to said first grid for conditionally inactivating said regenerative amplifier circuit by biasing said tube to electron current cutoff, and an electrical integrating circuit coupled with said first grid, said integrating circuit being adapted to respond to a series of electric wave signals exhibiting a variety of electric wave periods whereby said amplifier circuit is rendered regeneratively active by only those wave wave signals having sufficient time duration to impart to said integrating circuit a predetermined output voltage sufficient to overcome the electron current cutoff bias on said dscharge tube.

3. In an electrical wave discriminatory system, a combination of a vacuum tube negative transconductance type amplifier having an input circuit and an output circuit, means connecting said output circuit in regenerative relationship with said input circuit, a source of unidirectional control potential, an electrical connection adapting said control potential to statically inactivate said amplifier circuit, an electrical integrating circuit adapted to produce an output voltage having a magnitude which is a function of the wave periods of the electrical signals applied to the same, and means connecting the output voltage of said integrating circuit in algebraically additive relationship with said unidirectional control potential, whereby regenerative electrical signals are produced in said output circuit by only those applied input wave signals having electrical periods in excess of a predetermined value.

4. An electrical system selectively responsive to electric wave signals exhibiting various wave periods, said system comprising an electronic discharge tube having a cathode, a control electrode, a screen grid electrode, a suppressor grid electrode, and a plate electrode, a source of ground referenced unidirectional potential of positive polarity, a source of ground referenced unidirectional potential of negative polarity, an electrical path connecting said plate electrode to said positive polarity, an electrical impedance connecting said screen electrode to said positive polarity, an electrical impedance connected between said suppressor grid electrode and an input terminal, a capacitance connected between said suppressor electrode and ground potential, circuit connections applying said source of negative unidirectional potential to said suppressor grid electrode, means connecting said screen grid electrode with said suppressor grid electrode whereby electrical wave signals are generated at said screen electrode by only those wave signals applied to said input terminals having electrical periods in excess of predetermined value.

LOY E. BARTON.

References Cited in the file of this patent

UNITED STATES PATENTS

| Number | Name | Date |
|---|---|---|
| 1,975,143 | Farnsworth | Oct. 2, 1934 |
| 2,222,172 | Dimmick | Nov. 19, 1940 |
| 2,251,973 | Beale et al. | Aug. 12, 1941 |
| 2,281,934 | Geiger | May 5, 1942 |
| 2,295,364 | Jones | Sept. 8, 1942 |
| 2,359,447 | Seeley | Oct. 3, 1944 |
| 2,389,004 | Schroeder | Nov. 13, 1945 |
| 2,405,843 | Moe | Aug. 13, 1946 |
| 2,431,037 | Grundmann | Nov. 18, 1947 |
| 2,435,579 | Francis | Feb. 10, 1948 |
| 2,496,909 | Eberhard | Feb. 7, 1950 |